United States Patent Office 3,123,480
Patented Mar. 3, 1964

3,123,480
EDIBLE COLLAGEN CASING AND METHOD OF PREPARING SAME
Emanuel R. Lieberman, Somerville, N.J., assignor to Johnson & Johnson, a corporation of New Jersey
No Drawing. Filed Oct. 24, 1960, Ser. No. 64,291
8 Claims. (Cl. 99—176)

The invention relates to an improved collagen tube containing albuminaceous materials such as egg white and blood albumin, and to a method of applying albumin to collagen tubes.

The product of the invention is particularly adapted to be utilized as an edible casing for fresh pork sausages which must be cooked by the consumer, and sausages of the wiener or frankfurter type. The latter sausages are generally processed by being smoked and cooked by the packer and are generally reheated before they are consumed. When such sausages are provided with edible casings, it is unnecessary to remove the casing before the sausage is eaten.

Natural casings, i.e., those prepared from the intestines of animals such as cattle, swine and sheep, suffer from a number of disadvantages which limit their acceptance. While sheep casings command a high price because of the fact that they are exceptionally tender and may be readily eaten with the sausage, cleaned intestines, in spite of processing, are frequently tough and unpleasant to eat. In addition, the thickness of the wall and diameter of natural casings will vary, causing difficulty during modern high speed stuffing.

In view of the obvious deficiencies of natural casings and the expense of preparing such casings for human consumption, it is not surprising that many attempts have been made to prepare a better edible casing from other sources of collagen.

It has already been proposed to produce an artificial collagen casing from fibrous animal material, such as, for example, hide. The collagen in such fibrous material is converted by mechanical disintegration and the swelling action of acids into a plastic mass which is then extruded to form a tube. It has been found necessary, in order to obtain the mechanical strentgh required of the extruded casing in use, to include a tanning step in the manufacturing process. However, the tanned collagen casings so prepared have a high shrink tension when heated and contract to a fraction of their original size. Such casings, when stuffed with edible meat product, will not survive in the frying pan because cooking temperatures cause the collagen casing to shink, extruding the meat product.

It has now been discovered that when the collagen casing is treated with albuminous material, the stuffed casing will survive the frying operations.

It is an object of the present invention to produce a new and improved collagen casing having a surface coating of albuminous material that, when filled with an edible meat product, will survive without breaking or undue shrinkage when fried.

Another object of this invention is to produce a continuous extruded collagen tube which has been treated with albuminous material.

When the albumin is added to any of the processing baths, there will be some penetration of albumin into the wall of the collagen tube. It will be understood, therefore, that the albumin to a greater or lesser extent may be present throughout the entire wall of the collagen casing and that the present invention is not limited to a surface or layer effect.

There are many alternative methods of applying albuminous material to the extruded collagen casing. If the albumin is applied as a dried powder, it may simply be blown into the tube and will, under these conditions, adhere to the interior wall. It is also convenient to add the albumin to the plasticizing bath which may contain an aqueous solution of glycine, or a simple solution of albumin may be used to treat the interior surface of the casing. Preferbaly, the albumin is applied to the interior surface of the casing so that it will form a layer between the casing wall and the edible meat product when stuffed. The application of albumin to the interior surface of a casing is, however, not readily adaptable to a continuous process of extrusion. In order to avoid this difficulty, the casing may be treated from the outside and then inverted prior to use. An alternate approach to the internal treatment of the casing is to cut the continuously extruded product into pieces of about 25 to 200 feet in length and coat these shorter lengths individually.

The amount of albumin present in and on the finished casing may vary widely, depending upon the distribution of the albumin throughout the casing and the proportion of the total albumin that is present at the surface. In general, however, from about 2.5 to 5.0% of albumin based upon the total weight of the collagen casing as used prior to stuffing (casing equilibrated at relative humidity of about 50%) makes a noticeable improvement in the behavior of the casing during frying. To obtain this amount of albumin in and on the casing, the albumin may be applied to the wet casing as a 2.5 to 6.0% solution, or albumin may be added to one of the processing baths, e.g., the plasticizing bath, to give a solution of similar concentration. If a 2.5% albumin solution is used, the contact time of the casing should be about 10 minutes. This time may be reduced to about 2 minutes for a 6% solution. If the albumin is applied in the plasticizing bath, the ratio of albumin to glycerol is about 1:1. If the albumin is being applied to a dried casing, a 15% solution of albumin will be more effective and the ratio of albumin to glycerol will be about 3:2.

In order that those skilled in the art may better understand how the present invention may be carried out, the following examples are given by way of illustration and not by way of limitation. Throughout the specification and examples that follow, all quantities are expressed in parts by weight unless otherwise indicated.

For purposes of comparison, Examples I, III and V illustrate the preparation of collagen tubes which do not embody the invention, while Examples II, IV and VI are respectively the same except for the inclusion of treatment with albumin in accordance with the invention.

*Example I*

Fresh steer hides are washed with cold water at 60° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is important during the grinding process to keep the pulp below 20° C. This may be done by adding crushed ice to the hides as they are fed to the grinder.

The ground pulp is next diluted with tap water at 16° C. to give a smooth slurry containing 7.4% dry solids. This slurry (125 parts) is then treated with 125 parts of a 2.4% lactic acid solution using an inline mixer to form a homogeneous mass of swollen collagen fibrils. It is important during this acid swelling step that the temperature be maintained below about 25° C. The mixture so obtained contains 3.7% hide solids and 1.2% lactic acid. After the pulp is blended with acid, the mass of swollen collagen fibrils is further dispersed in a suitable homogenizer, fitted with a 2-stage valve and operated with a 1500 p.s.i. drop per stage.

The swollen collagen mass so obtained is filtered through a 7-mil filter screen and extruded in the form of a seamless tube in such a way as to impart some collagen fibril orientation transverse to the extrusion direction. This may be partially accomplished by inflating the casing as it leaves the nozzle.

This extruded collagen tube of swollen collagen fibrils is coagulated for 6 minutes in an aqueous ammonium sulfate bath containing 40% ammonium sulfate adjusted to a pH of 7.0 with sodium hydroxide and is then prewashed for an equal period of time in 15% ammonium sulfate similarly adjusted to pH 6.5.

Alum tanning of this extruded casing is accomplished by treatment with an alum solution containing 6% alum $$[NH_4Al(SO_4)_2 \cdot 12H_2O]$$

1.0% nitric acid and 4.0% ammonium sulfate. The contact time is 6 minutes and this alumn tanning solution is maintained at pH 4.3. After the tanning step, the casing is washed in tap water for 14 minutes using two changes of water. The casing is finally passed through a bath containing 3.6% glycerol, 20 parts per million formaldehyde and 0.1% sodium bicarbonate. The dwell time in this bath is 5 minutes. After the casing has been plasticized, it is inflated and dried for 9 minutes in a rapid stream of air at 80° C. and 8% relative humidity.

This casing has a wall thickness of 0.95 mil and a burst strength of 18 pounds per square inch. This product stuffed and linked satisfactorily, but when cooked in the frying pan shrank excessively and ruptured.

*Example II*

The warm air-dried collagen casing prepared exactly as described in Example I above is treated with an aqueous solution containing 15% of a commercial grade of powdered egg white and 10% glycerine. This solution is applied to the interior of the casing at the rate of 1.5 millimeters per foot of casing treated and the casing is then dried at room temperature while inflated.

The albumin-treated casing has a wall thickness of 0.95 mil and a burst strength of 16 pounds per square inch. The product may be shirred, stuffed and linked without difficulty and cooked without undue shrinkage.

*Example III*

A homogeneous mass of swollen collagen fibrils (4% hide solids and 0.88% lactic acid) prepared as described in Example I above, is filtered through a 7-mil filter screen and extruded in the form of a seamless tube in such a way as to impart some collagen fibril orientation transverse to the direction of extrusion.

This extruded collagen tube of swollen collagen fibrils is coagulated for 6 minutes in an aqueous ammonium sulfate bath containing 40% ammonium sulfate adjusted to a pH of 7.0 with ammonium hydroxide and is then prewashed for an equal period of time in 15% ammonium sulfate similarly adjusted to pH 6.5.

Alum tanning of this extruded casing is accomplished by treatment with an alum solution containing 3% alum $$[NH_4Al(SO_4)_2 \cdot 12H_2O]$$

0.5% citric acid and 10% ammonium sulfate. The contact time is 6 minutes and the pH is maintained at 4.3. After the tanning step, the casing is washed in tap water for 14 minutes with two changes of water. The casing is finally plasticized by passing it through a bath containing 3.6% glycerol. The dwell time in this bath is 5 minutes. After the casing has been plasticized with glycerol, it is inflated and dried for 9 minutes in a rapid stream of air at 80° C. and 8% relative humidity. The casing is then heat-cured in a forced draft oven at 72° C. and 27% relative humidity for 24 hours.

This casing has a wall thickness of 0.8 mil and a burst strength of 11 pounds per square inch. This product stuffed and linked satisfactorily but when cooked in the frying pan, shrank excessively and ruptured.

*Example IV*

The dried collagen casing prepared exactly as described in Example III above is treated with an aqueous solution containing 15% of a commercial grade of powdered egg white and 10% glycerol prior to the 24-hour heat-curing step. Twenty-five foot lengths of the casing are treated with the albumin-glycerol solution by passing this solution through the casing and the casing is hung up for 30 minutes at room temperature to air dry. The albumin-glycerol treated casings are then heat-cured in a forced draft oven at 72° C. and 27% relative humidity for 24 hours. This product has a wall thickness of 0.8 mil and a burst strength of 12 pounds per square inch. This product may be shirred, stuffed and linked without difficulty and cooks satisfactorily without undue shrinkage.

*Example V*

A homogeneous mass of swollen collagen fibrils (4% hide solids and 1.2% lactic acid) prepared as described in Example I above, is filtered through a 7-mil filter screen and extruded in the form of a seamless tube. This extruded tube of swollen collagen fibrils is coagulated for 6 minutes in an aqueous ammonium sulfate bath containing 40% ammonium sulfate adjusted to a pH of 7.0 with ammonium hydroxide and is then prewashed for an equal period of time in 15% ammonium sulfate similarly adjusted to pH 6.5.

Alum tanning of this extruded casing is accomplished by treatment with an alum solution containing 3% alum $[NH_4Al(SO_4)_2 \cdot 12H_2O]$, 0.5% citric acid and 10% ammonium sulfate. The contact time is 6 minutes and this alum tanning solution is maintained at pH 4.3. After the tanning step, the casing is washed in tap water for 14 minutes using two changes of water. The casing is finally plasticized by passing it through a bath containing 3.6% glycerol. The dwell time in this plasticzing bath is 5 minutes.

The plasticized casing is inflated and dried for 9 minutes in a rapid stream of air at 80° C. and 8% relative humidity and is then heat-cured in a forced draft oven at 72° C. and 27% relative humidity for 24 hours.

This casing has a wall thickness of 1.0 mil and a burst strength of 18 pounds per square inch. This product stuffed and linked satisfactorily but gave excessive shrinkage when cooked.

*Example VI*

A collagen casing is prepared exactly as described above in Example V, except that 0.3% low viscosity carboxymethyl cellulose and 5% of a commercial grade of powdered egg white are added to the plasticizing bath and the glycerol concentration is increased from 3.6% to 6.0%. The carboxymethyl cellulose used has a viscosity of 25–50 cps. in 2% aqueous solution at 25° C. as determined by a Brookfield viscosimeter, and the degree of substitution is 0.75. This cellulose derivative is stated to have about one-quarter of the three available anhydroglucose units substituted with carboxymethyl groups. The dwell time in this bath is 5 minutes. The casing is then rinsed for 1 minute, by passing it through a water bath. After the casing has been washed, it is inflated and dried at 80° C. and 8% relative humidity for 9 minutes. The dried casing is then heat-cured in a forced draft oven at 72° C. and 27% relative humidity for 24 hours.

This casing has a wall thickness of 1.0 mil and a burst strength of 22 pounds per square inch. This product stuffed and linked satisfactorily and cooked satisfactorily without excessive shrinkage.

What is claimed is:

1. An edible extruded collagen casing comprising collagen fibrils, said casing having a surface coating of an albuminous material.

2. The collagen casing of claim 1 in a shirred condition.

3. The collagen casing of claim 1 characterized by a surface coating of albuminous material which penetrates beyond the surface of the wall of the casing.

4. The collagen casing of claim 1, the interior surface of which is coated with an albuminous material.

5. The collagen casing of claim 4 in a shirred condition.

6. An edible sausage comprising an extruded casing of collagen fibrils, the interior surface of said casing being coated with an albuminous material, and said casing being filled with an edible meat product whereby the sausage may be cooked satisfactorily without excessive shrinkage.

7. A method of improving the cooking characteristics of an edible casing prepared by swelling hide in an acid solution at a temperature below 25° C. to obtain a mass of swollen collagen fibrils, and extruding this mass in the form of a tube into a coagulating bath; which comprises treating at least one surface of said casing with a solution of an albuminous material, whereby said albuminous material penetrates into the wall of the casing.

8. A method of improving the cooking characteristics of an edible casing prepared by swelling hide in an acid solution at a temperature below 25° C. to obtain a mass of swollen collagen fibrils, and extruding this mass in the form of a tube into a coagulating bath; which comprises blowing a dried albuminous material into the casing, whereby said albuminous material adheres to the wall of the casing.

References Cited in the file of this patent

UNITED STATES PATENTS

| | | |
|---|---|---|
| 1,616,971 | Henderson | Feb. 8, 1927 |
| 2,337,645 | Cadwell | Dec. 28, 1943 |
| 2,586,945 | Harrel et al. | Feb. 26, 1952 |
| 2,988,451 | Zahn | June 13, 1961 |
| 3,071,477 | Klevens | Jan. 1, 1963 |

FOREIGN PATENTS

| | | |
|---|---|---|
| 350,758 | Great Britain | June 18, 1931 |

UNITED STATES PATENT OFFICE

CERTIFICATE OF CORRECTION

Patent No. 3,123,480                                March 3, 1964

Emanuel R. Lieberman

It is hereby certified that error appears in the above numbered patent requiring correction and that the said Letters Patent should read as corrected below.

Column 3, line 25, for "nitric" read -- citric --; line 26, for "alumn" read -- alum --.

Signed and sealed this 14th day of July 1964.

(SEAL)

Attest:

ESTON G. JOHNSON                                EDWARD J. BRENNER
Attesting Officer                                   Commissioner of Patents